United States Patent [19]

Snow

[11] E Re. 29,491

[45] Reissued Dec. 13, 1977

[54] METHOD OF MAKING A CABLE-TYPE SAW

[75] Inventor: Henry A. Snow, Rindge, N.H.

[73] Assignee: Helen E. Snow, Rindge, N.H.

[21] Appl. No.: 724,243

[22] Filed: Sept. 17, 1976

Related U.S. Patent Documents

Reissue of:

[64] Patent No.: 3,847,569
Issued: Nov. 12, 1974
Appl. No.: 361,401
Filed: May 18, 1973

U.S. Applications:

[63] Continuation of Ser. No. 171,513, Aug. 13, 1971, abandoned.

[51] Int. Cl.[2] ..... C04B 31/16

[52] U.S. Cl. ..... 51/309 R; 125/21

[58] Field of Search ..... 51/309; 125/18, 21

[56] References Cited

U.S. PATENT DOCUMENTS

| | | | |
|---|---|---|---|
| 3,402,035 | 9/1968 | Martin | 51/309 X |
| 3,598,101 | 8/1971 | Hensley | 125/21 |

FOREIGN PATENT DOCUMENTS

| | | | |
|---|---|---|---|
| 1,203,000 | 7/1959 | France | 125/21 |
| Ad. 72,179 | 10/1959 | France | 125/21 |
| 723,197 | 2/1955 | United Kingdom | 125/21 |

*Primary Examiner*—Harold D. Whitehead
*Attorney, Agent, or Firm*—Norman S. Blodgett; Gerry A. Blodgett

[57] ABSTRACT

A saw consisting of a loop of cable on which are mounted a polarity of abrasive elements, each element having a small sleeve.

4 Claims, 8 Drawing Figures

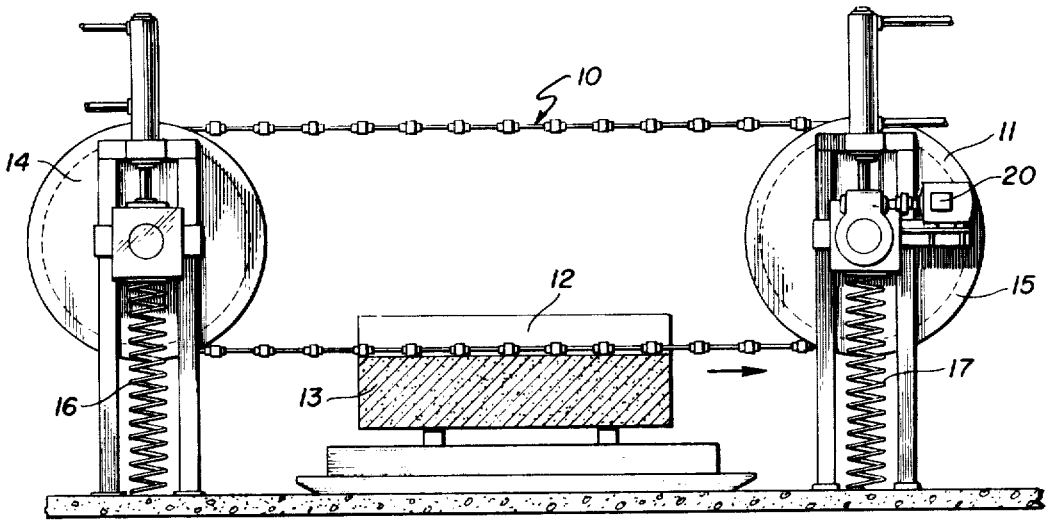
FIG. 1
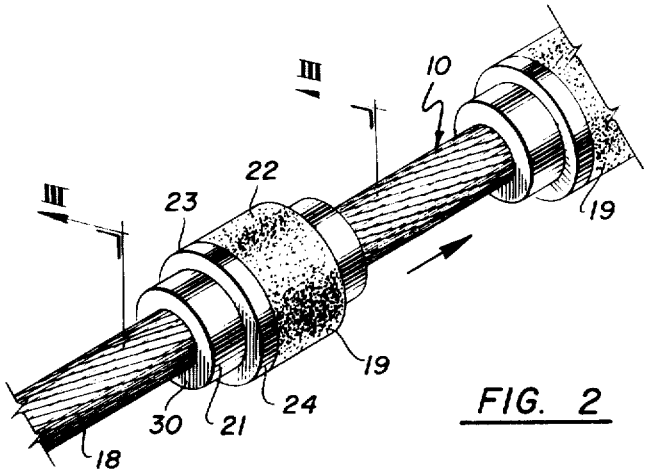
FIG. 2
FIG. 3
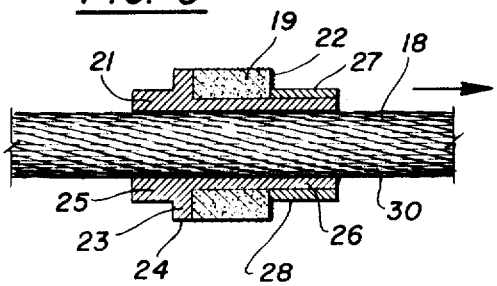
HENRY A. SNOW
INVENTOR.
BY
Mann S. Blodgett
ATTORNEY

METHOD OF MAKING A CABLE-TYPE SAW

Matter enclosed in heavy brackets [ ] appears in the original patent but forms no part of this reissue specification; matter printed in italics indicates the additions made by reissue.

*REFERENCE TO PRIOR APPLICATIONS*

This is *an application for a reissue of U.S. Pat. No. 3,847,569 based on application Ser. No. 361,401 filed May 18, 1973 which was* a continuation of application Ser. No. 171,513 filed Aug. 13, 1971, *now abandoned.*

BACKGROUND OF THE INVENTION

In the cutting of stone and other hard materials, it is common practice to use a machine incorporating a loop of cable. An abrasive slurry is provided for the cable and the cable serves to carry the abrasive slurry through the stone to make the cut. The time-honored method does the cutting after a fashion, but suffers from a number of handicaps. First of all, the cut does not have a particularly smooth surface when finished. Secondly, the cables have a relatively short life. Many attempts have been made to overcome these deficiencies. One method that has been tried is to coat the cable with particles of an abrasive such as diamonds; unfortunately, the diamonds do not stay in place because there is no known substance for attaching them to the cable surface in such a way that the particles remain on the cable. A tremendous force is brought to bear on the individual diamond particles which eventually results in the particles being torn from the cable surface. Another method that has been tried is to incorporate the diamond particles in a small bonded abrasive wheel which in turn is threaded on the cable. Although this method gives a smooth surface to the cut, nevertheless difficulties have been experienced with breakage of the wheels and difficulty in preventing them from sliding on the cable under the impetus of the tremendous cutting forces that are applied to the little wheels. These and other difficulties experienced with the prior other devices have been obviated in a novel manner by the present invention.

It is, therefore, an outstanding object of the invention to provide a cable-type saw which is simple in construction and which is capable of a long life of useful service.

Another object of this invention is the provision of a cable-type saw which gives a smooth cut through stone or the like.

A further object of the present invention is the provision of an abrasive element having high impact strength for use in a cable-type saw or the like.

It is another object of the instant invention to provide a method of producing an abrasive element for use in high impact-force application such as cutting stone.

A still further object of the invention is the provision of an improved cable-type stone cutting element having a greatly simplified and less costly construction.

It is a still further object of the present invention to provide individual disc-like abrasive wheels having a unitized, integrally fabricated construction.

It is a further object of the invention to provide a greatly simplified and inexpensive means of positioning individual disc-like abrasive wheels on a wire or cable.

SUMMARY OF THE INVENTION

In general, the invention consists of a saw of the type utilized in cutting stone or the like having an elongated flexible cable and a plurality of small-diameter abrasive wheels mounted on the cable. Each of the wheels is provided with a centrally-located passageway in which lies a metal sleeve having a bore substantially the diameter of the cable to provide a tight threading of said cable therethrough. Means is provided for holding each of such sleeves and abrasive wheels in fixed, nonrotatable, spaced relationship on said cable.

More specifically, the means consists of a flange on the sleeve located at one side of each of the wheels. The flange has an outside diameter larger than the inside diameter of centrally-extending passageway in the wheel, the extremities of the cable being joined to form an endless cutting element.

The invention also consists of an abrasive element having a tubular main body on which is mounted an abrasive body, the main body having a radially-extending flange to hold the abrasive body in place.

The invention also consists of a method for producing an abrasive element, consisting of the steps of forming a main body of malleable metal with a cylindrical portion of large diameter and a cylindrical portion of small diameter. The main body is placed in a die having a bore to fit the portion of large diameter and a mixture of an abrasive substance and bonding agent is inserted in the space between the surface of the bore and the portion of small diameter and is compressed. The main body and abrasive substances then sintered, the main body with the abrasive body on it may then be further machined to be adapted to its particular use.

BRIEF DESCRIPTION OF THE DRAWINGS

The character of the invention, however, may be best understood by reference to one of its structural forms as illustrated by the accompanying drawings, in which:

FIG. 1 is a front elevational view of a stone-cutting machine embodying the principles of the present invention, shown in use with a saw, FIG. 2 is a perspective view of a portion of the saw, FIG. 3 is a sectional view of the saw taken on the line III—III of FIG. 2, FIGS. 4, 5, 6, and 7 show various steps in a method of forming an abrasive element to be used in the saw.

DESCRIPTION OF THE PREFERRED EMBODIMENT

Figure 4:
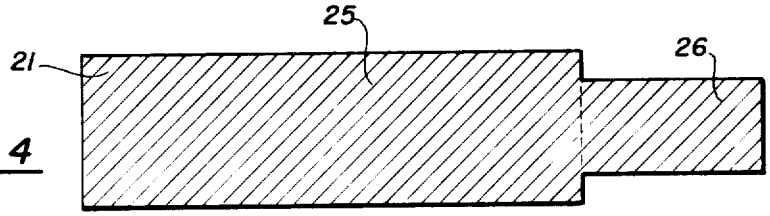

Referring first to FIG. 1, wherein are best shown the general features of the invention, the saw, indicated generally by the reference numeral 10, is shown in use with a stone-cutting machine 11 for forming a cut 12 in a stone 13. It can be seen that the saw 10 is in the form of a loop, which runs around the pulleys 14 and 15 which are rotatably mounted in the frame of the machine. The weight of the wheels and the cable is partially supported by springs 16 and 17 underlying the wheels which are mounted in the frame for vertical sliding motion relative to the stone 13. One of the wheels is suitably driven (by a method not shown, but which is old in the art) to cause the lower run of the loop of the saw 10 to pass through the cut 12 in the stone. The wheels and the saw can be advanced downwardly by use of a screw associated with each wheel in the integral way.

Referring to FIG. 2, it can be seen that the saw 10 consists of a cable 18 formed from strands of high-strength steel on which are mounted in space relationship a polarity of abrasive elements 19. Each abrasive element consists of a main body 21 formed of a malleable metal on which is mounted a cylindrical abrasive portion 22. The diameter of the cylindrical abrasive portion is equal to the desired width of the cut 12 in the stone 13. The main body 21 is provided with a radial flange 23, having an outer cylindrical surface 24 which constitutes an extension of the cylindrical surface of the abrasive portion 22.

In FIG. 3 it can be seen that the main body 21 consists of a first cylindrical portion 25 of large diameter and a second cylindrical portion 26 of small diameter. The abrasive portion 22 is in the form of a wheel which fits over the second portion 26. The flange 23 extending outwardly of the first portion 25 at the shoulder between the first portion and the second portion. Also arranged on the second portion 26 is a sleeve 27 having an outer cylindrical surface 28 which is the same diameter as the diameter of the first cylindrical portion 25 of the main body. The sleeve is tightly fixed on the second portion 26 of the main body and is pressed tightly against the radial side of the abrasive portion 22 which faces it.

Although it is not evident in the drawings, the main body 21 has a central bore 30 through which the cable extends rather tightly and the body is securely fastened to the cable 18 by swaging. The free end of the first portion 25 is swaged through the cable or use of a swaging tool operative on its cylindrical surface adjacent the end. The other end of the main body and the sleeve 27 is fastened to the cable by swaging downwardly on its cylindrical surface 28, which has the effect of also swaging the outer end of the reduced or second cylindrical portion 26 of the main body. Furthermore, in the preferred embodiment, the abrasive portion 22 is formed on the main body 19 by compacting a mixture of abrasive particles and bonding material under the main body and centering the entire assemblage by a method which will be related in greater detail further on in this description.

The operation of the invention will now be readily understood in view of the above description. The machine 11 is operated by driving one of the wheels 14 and 15 as the saw passes through the cut 12 in the stone 13. At all times the abrasive elements 19 engage the bottom of the cut 12 and the diamond particles remove layers of stone. Suitable pressure is brought to bear between the cable or saw 10 and the bottom of the cut 12 by a careful balancing of the springs 16 and 17 with the screwdown apparatus associated with the machine.

The arrows in FIGS. 2 and 3 show the direction that the saw is moved through the stone. It can be seen that the abrasive element 19 is advanced so that the abrasive portion 22 moves first through the cut 12 and is followed by the flange 23. Since most bonded abrasive materials are somewhat brittle as compared with the malleable metal of the main body (which in preferred embodiment is formed of copper), the strong flange lends support to the abrasive support. The next effect 15 is an abrasive element which has a cutting quality of a more friable abrasive substance (which may be in the nature of a ceramic) and yet the strength and toughness of the material from which the main body is formed. Naturally, when the abrasive material wears, the surface 24 of the flange will be exposed to the stone. Since the material of which the main body is formed is much softer than the abrasive material, this flange will wear down and maintain at all times the same diameter as the abrasive portion 22.

In the preferred embodiment, the abrasive portion 22 is formed as a mixture of diamond particles and powdered copper, which mixture is suitably compressed and sindered in the well-known manner to produce a tough yet friable abrasive product. The entire abrasive element, of course, is prevented from moving along or rotating about the cable 18 by the swaging, which has taken place between the ends of the main body, the sleeve 27, and the cable itself. The fact that the cable is formed of a plurality of strands provides it with a configurated surface into which the malleable copper of the main body and the sleeve may be swaged or forged.

Figure 5:
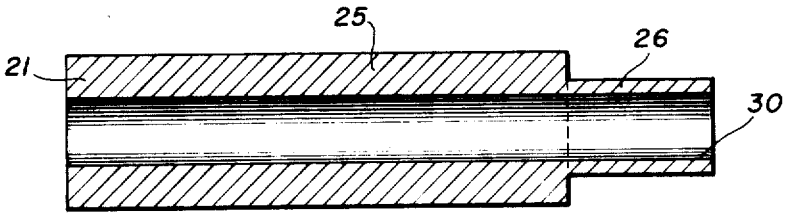
Figure 6:
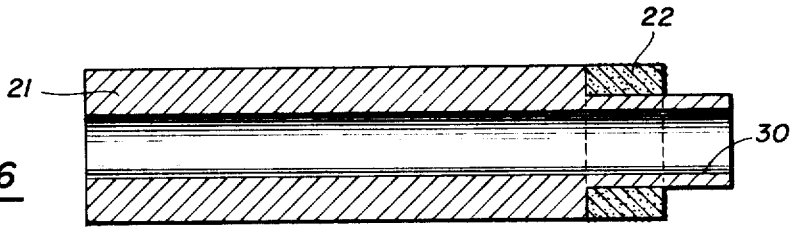

FIGS. 4 through 7 show the manner in which the abrasive element 19 is formed. The main body 21 is formed on a screw machine from a copper bar, having the same original diameter as the first portion 25, to give the element as shown in FIG. 4. As indicated in FIG. 5, the bore 30 is then provided concentrically to the first portion 25 and to the second portion 26, which has a reduced diameter. As evident in these figures, at the beginning the first portion 25 is relatively long for ease of handling the element. In FIG. 6, it can be seen that the main body 21 is provided with the abrasive portion 22. The abrasive portion 22 is formed as a mixture of abrasive particles and a binder which is pressed onto the main body 21 by methods common to the sintered-metal art. The main body with the compressed abrasive portion is then passed into a furnace for sintering. Preferably, the furnace has a reducing atmosphere and sintering takes place at the usual temperature. If the binder is formed as copper powder, as common in this art, particularly when the abrasive particles are diamond, the temperature would be in the order of 1,000° F. The result of the sintering operation is that the main body is relatively untouched and remains not only malleable but quite strong and tough. The abrasive portion 22 has a degree of toughness, particularly when copper powder is used as the binder, but is considerably more friable as is desirable in a grinding element.

Figure 7:
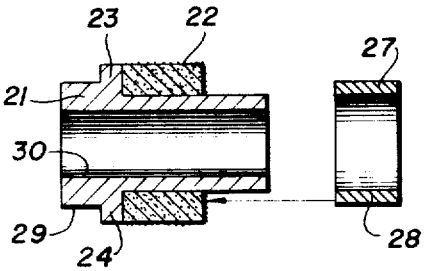

Finally, in FIG. 7, we can see that the main body 21 is out off adjacent the flange 23 and is provided with a reduced portion 29 which has the same diameter as the outer surface 28 of the sleeve 27. Then, the sleeve 27 is slid onto the second portion 26 of the main body and pressed tightly against the outer radial surface of the abrasive portion 22 to hold it in place. The abrasive element 21 is now completed. It is, of course, eventually strung onto the cable 18, and the reduced portion 29, as well as the sleeve 27, is swaged. The free end of the second portion 26 is also swaged onto the cable.

Figure 8:
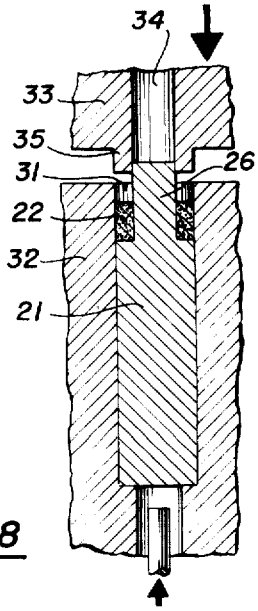
FIG. 8 shows a modification of the method of forming the abrasive element.

FIG. 8 shows in detail the manner in which the abrasive portion 22 is placed on the main body 21. In the drawing, the body 21 has not yet been provided with the bore 30, since this bore can be provided either before or after the sintering operation. The first portion 25 of the main body 21 is located in a cylindrical recess 31 in a die 32 mounted on the table of a press (not shown). An upper die 33 is mounted on the upper movable portion of the press and is capable of moving downwardly with considerable force. The upper die 33 is provided with a bore 34 having exactly the same diameter as the second bore reduced portion 26 of the main body. The die 33 also has a downwardly-protruding lip 35 which is concentric with the bore 34 and which has an outer diameter exactly the same as that of the recess 31, so it is freely slidable in it. In operating the apparatus, the mixture of diamond particles and copper powder is placed in the annular space between the reduced portion 26 and the surface of the recess 31. An exact predetermined amount is used and the upper die 33 is moved downwardly. The lip 35 enters the recess 31 and presses the mixture downwardly with the pressure in the order of 50,000 lbs/sq.in. The amounts used and the pressures used are common knowledge in the sintering art and need be described no further. The main body 21 with its pressed abrasive portion 22 is then ready for the sintering operation at high temperature to produce a hard friable abrasive element.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method of forming a cable type saw, comprising the steps of:

a. forming a main body element of malleable metal having two axially adjacent cylindrical portions, one portion having a large diameter and the other portion having a small diameter, b. placing the body element in a bore in a die, which bore has the same diameter as the said large diameter, c. placing a powdered abrasive substance in the space between the surface of the bore and the portion of small diameter, d. pressing the substance in the space axially toward the portion of large diameter, thereby causing a part of the small diameter portion to extend axially beyond the substance, e. raising the temperature of the pressed substance to produce a solid body, f. forming a centrally-located axially-directed bore in the body, g. placing a piece of flexible cable through the bore in the body, h. placing a collar concentrically over the said part of the small diameter portion, and i. swaging the collar so that it fixedly engages the body and so that the body fixedly engages the cable.

2. A method of forming a cable type saw, comprising the steps of:

a. forming a main body element of malleable metal having two axially adjacent cylindrical portions, one portion having a large diameter and the other portion having a small diameter, b. placing the body element in a bore in a die, which bore has the same diameter as the said large diameter, c. placing a powdered abrasive substance in the space between the surface of the bore and the portion of small diameter, d. pressing the substance in the space axially toward the portion of large diameter, thereby causing a part of the small diameter portion to extend axially beyond the substance, e. raising the temperature of the pressed substance to produce a solid body, f. forming a centrally-located axially-directed bore in the body, g. placing a piece of flexible cable through the bore in the body, h. placing a collar concentrically over the said part of the small diameter portion, i. swaging the collar so that it fixedly engages the body and the body beneath it fixedly engages the cable, j. forming a second portion of small diameter from a part of the portion of large diameter, and k. swaging the second portion so that the body beneath it fixedly engages the cable.

3. A method of forming a cable type saw, comprising the steps of:

a. forming a main body element of malleable metal having two axially adjacent cylindrical portions, one portion having a large diameter and the other portion having a small diameter, b. placing the body element in a bore in a die, which bore has the same diameter as the said large diameter, c. placing a powdered abrasive substance in the space between the surface of the bore and the portion of the small diameter, d. pressing the substance in the space axially toward the portion of large diameter, thereby causing a part of the small diameter portion to extend axially beyond the substance, e. raising the temperature of the pressed substance to produce a solid body, f. forming a centrally-located axially-directed bore in the body, g. placing a piece of flexible cable through the bore in the body, h. swaging the small diameter portion so that the body fixedly engages the cable, and i. placing a collar concentrically over the said part of the small diameter portion.

*4. A method of forming a cable type saw, comprising the steps of:*

*a. forming a main body of malleable metal having two axially adjacent cylindrical portions, one portion having a large diameter and the other portion having a small diameter,*

*b. placing the body element in a bore in a die, which bore has the same diameter as the said large diameter,*

*c. placing a powdered abrasive substance in the space between the surface of the bore and the portion of small diameter,*

*d. pressing the substance in the space axially toward the portion of large diameter, thereby causing a part of the small diameter portion to extend axially beyond the substance,*

*e. raising the temperature of the pressed substance to produce a solid abrasive body,*

*f. forming a centrally-located axially-directed bore in the body,*

*g. placing a piece of flexible cable through the bore in the body,*

*h. providing a shoulder at the said portion of small diameter, so that it fixedly engages the abrasive body and so that the main body fixedly engages the cable.*

* * * * *